United States Patent [19]
Ho

[11] Patent Number: 6,100,310
[45] Date of Patent: Aug. 8, 2000

[54] PROCESS FOR MAKING MICROCELLULAR POLYURETHANE ELASTOMERS

[75] Inventor: David J. Ho, Berwyn, Pa.

[73] Assignee: Bayer Antwerp N.V., Antwerp, Belgium

[21] Appl. No.: 09/160,968

[22] Filed: Sep. 25, 1998

[51] Int. Cl.⁷ .................................................. C08G 18/04
[52] U.S. Cl. ........................ 521/159; 521/170; 521/174
[58] Field of Search .............................. 528/66; 521/159, 521/170, 174

[56] References Cited

U.S. PATENT DOCUMENTS

| | | | |
|---|---|---|---|
| 4,559,366 | 12/1985 | Hostettler | 521/51 |
| 4,687,851 | 8/1987 | Laughner | 544/398 |
| 5,106,874 | 4/1992 | Porter et al. | 528/64 |
| 5,250,582 | 10/1993 | Hire et al. | 521/157 |
| 5,284,880 | 2/1994 | Harrison et al. | 521/51 |
| 5,470,813 | 11/1995 | Le-Khac | 502/175 |
| 5,482,908 | 1/1996 | Le-Khac | 502/156 |
| 5,618,967 | 4/1997 | Narayan et al. | |
| 5,658,959 | 8/1997 | Voloppi et al. | 521/51 |
| 5,677,413 | 10/1997 | Barksby et al. | 528/65 |
| 5,696,221 | 12/1997 | Barksby et al. | 528/64 |
| 5,728,745 | 3/1998 | Allen et al. | 521/159 |
| 5,792,829 | 8/1998 | Allen et al. | 528/419 |

*Primary Examiner*—John M. Cooney
*Attorney, Agent, or Firm*—Joseph C. Gil

[57] ABSTRACT

Microcellular elastomers and a process for making them are disclosed. The process comprises reacting a resin component ("B" side) with an isocyanate-terminated prepolymer ("A" side). Pre-reacting the right proportion of chain extender into an "A" side that also includes a high-primary, low-unsaturation polyol is the key to making low-density (less than 0.5 g/cm³) microcellular elastomers while avoiding problems with poor processing or inferior physical properties. The process is easy to practice, and provides lighter, high-quality polyurethane products, including protective sports equipment, arm rests or steering wheels for the auto industry, and midsoles or shoe soles for footwear.

14 Claims, No Drawings

PROCESS FOR MAKING MICROCELLULAR POLYURETHANE ELASTOMERS

FIELD OF THE INVENTION

The invention relates to microcellular polyurethane elastomers and a process for making them. The elastomers are valuable for a variety of uses, most notably in automotive applications and footwear.

BACKGROUND OF THE INVENTION

Microcellular polyurethane elastomers are well known. They have fine, evenly distributed cells, and densities that are low compared with solid urethane elastomers yet high compared with flexible polyurethane foam. Microcellular polyurethane elastomers are used in automotive parts (e.g., bumpers and armrests), gaskets, vibration damping applications, and footwear.

While many ways to make microcellular polyurethane elastomers have been revealed, most approaches fit into two categories: the "one-shot" method and the "prepolymer" method. In the one-shot method, all of the components (polyols, polyisocyanate, blowing agents, surfactant, catalyst, chain extenders) are combined and reacted in a single step. In contrast, the prepolymer approach pre-reacts the polyisocyanate with a polyol to make a "prepolymer" (the "A" side) that is subsequently combined with the remaining reactants including any chain extenders (the "B" side), in a second step to make the elastomer. As U.S. Pat. No. 4,559,366 illustrates, it can be beneficial to make a "quasiprepolymer" by using an by reacting the polyol with enough polyisocyanate to produce a mixture of isocyanate-terminated prepolymer and free polyisocyanate. Such quasiprepolymers are commonly used to boost the available NCO content of the "A" side.

It is also known to prepare prepolymers ("A" sides) from isocyanates and polyol-chain extender mixtures. For example, U.S. Pat. No. 5,658,959 teaches to make an isocyanate-terminated prepolymer from MDI, dipropylene glycol, a polyoxypropylated/ethoxylated glycerine, and a polyoxypropylated/ethoxylated glycol (see Example 1). The reference polyols have up to 35 wt. % of ethylene oxide content, but an undisclosed degree of "endcapping" or primary hydroxyl group content (see column 5, lines 17–38). The reference is also silent regarding the unsaturation level of the polyols. U.S. Pat. No. 5,618,967 contains a similar disclosure. In sum, these references suggest that neither the unsaturation level nor the primary hydroxyl content of the polyols is important.

U.S. Pat. No. 5,284,880 also shows (see, e.g., column 13, lines 30–45) a prepolymer made from an isocyanate, a polyol, and a chain extender (dipropylene glycol). This reference teaches, however, that the "A" side polyol must be a "polyether containing predominately secondary hydroxyl groups" (see Abstract; col. 2, lines 4–5; and col. 4, lines 28–54). This reference is also silent regarding any need for a low-unsaturation polyol.

The benefits of polyols with low levels of unsaturation (<0.020 meq/g) for polyurethanes generally and for microcellular polyurethane elastomers in particular are known. U.S. Pat. Nos. 5,677,413 and 5,728,745, for example, describe microcellular polyurethanes made from polyols having unsaturations less than about 0.010 meq/g. The '745 patent makes the elastomers by either the prepolymer method (see Example 8 and Table 6 of the reference) or by the one-shot approach (see Examples 9–11 and Table 8 of the reference). The prepolymers of Example 8 are reaction products of polyoxypropylene diols or triols with 4,4'-MDI. No chain extender is used to make the prepolymer. In Examples 9–11, high-primary, low-unsaturation polyols are used. The references teach several advantages of using low-unsaturation polyols, including good resilience, low compression set, and reduced shrinkage; these advantages are particularly important for shoe soles.

U.S. Pat. No. 5,106,874 teaches prepolymer and one-shot approaches to making noncellular elastomers from low-unsaturation polyols. The prepolymers are generally made by reacting polyoxyalkylene polyols with an excess of polyisocyanate. The reference teaches that chain extenders can be included in the prepolymer (column 7, lines 49–52). However, none of the actual examples includes a chain extender reacted into the "A" side, and no microcellular elastomers are made.

U.S. Pat. No. 5,696,221 teaches to make polyurethane/urea elastomers by reacting prepolymers with a chain extender. The prepolymers include a diol having a molecular weight less than 400 in addition to a low-unsaturation, polyoxypropylene diol. The reference does not disclose microcellular elastomers.

Despite the well-recognized benefits of using low-unsaturation polyols in formulating microcellular polyurethane elastomers, some problems remain with the conventional one-shot and prepolymer approaches. As noted in U.S. Pat. No. 4,559,366, the one-shot approach cannot easily be used with 4,4'-diphenylmethane diisocyanate (4,4'-MDI), a ubiquitous raw material for shoe sole elastomers, because it is not readily miscible with other reactants, and it solidifies at room temperature (see col. 1 of the reference).

The prepolymer approach, however, also has drawbacks. Formulating high-quality, low-density elastomers, especially ones that have densities less than 0.5 $g/cm^3$, is difficult. An obvious way to reduce density is to increase the amount of blowing agent (usually water). However, this increases the urea content of the elastomer, reduces elongation, and reduces flexibility. Adding more chain extender into the "B" side helps to maintain good hardness at lower densities, but this can cause poor processability and premature phase separation. As Comparative Example 8 (below) shows, such products often have an undesirable incidence of surface defects and internal splitting.

While it is known to include some chain extender in the "A" side, little or nothing is known about the benefits of doing so in the context of making microcellular elastomers based on low-unsaturation polyols, particularly those having a high content of primary hydroxyl groups.

In sum, the industry would benefit from better ways to make microcellular polyurethane elastomers, especially low-density elastomers. A preferred approach would use the low-unsaturation polyols now known to confer significant physical property advantages to urethanes. A valuable process would be easy to practice, yet would overcome the drawbacks of the conventional one-shot and prepolymer methods, particularly in formulating low-density elastomers.

SUMMARY OF THE INVENTION

The invention is a breakthrough process that enables formulators of microcellular elastomers to achieve densities below 0.5 $g/cm^3$ without sacrificing good processing latitude or excellent elastomer properties. The process comprises reacting a resin component ("B" side) with an isocyanate-terminated prepolymer ("A" side), optionally in the presence of a blowing agent, a surfactant, and a catalyst. The resin component includes a first chain extender and a first high-primary, low-unsaturation polyol. The key component, however, is the prepolymer, which is made by reacting a polyisocyanate, a second high-primary, low-unsaturation polyol, and a second chain extender. The second chain extender reacted into the "A" side comprises from about 5 to about 60 equivalent percent of the total chain extender.

I surprisingly found that pre-reacting the right proportion of a chain extender component into an "A" side that also includes a high-primary, low-unsaturation polyol as part of the prepolymer is the key to making low-density (less than 0.5 g/cm$^3$) microcellular elastomers while avoiding problems with poor processing or inferior physical properties. The process is easy to practice, and provides lighter, high-quality polyurethane products, including protective sports equipment, arm rests or steering wheels for the auto industry, and midsoles or shoe soles for footwear.

DETAILED DESCRIPTION OF THE INVENTION

In the process of the invention, the resin component ("B" side) comprises a first high-primary, low-unsaturation polyol, and a chain extender.

Polyols useful in the process of the invention are prepared by ring-opening polymerization of cyclic ethers, and include epoxide polymers, oxetane polymers, tetrahydrofuran polymers, and the like. The polyols can be made by any desired method; however, the ultimate product must have both low unsaturation and a high content of primary hydroxyl groups. Preferred are polyether polyols made by polymerizing epoxides, especially propylene oxide and/or ethylene oxide. Particularly preferred are propylene oxide-based polyols that are capped or tipped with oxyethylene groups.

The polyol has a high content of primary hydroxyl end groups. Such polyols are normally made by tipping or capping the ends of an polyoxypropylene polyol with oxyethylene units. By "high-primary," we mean polyols having at least about 50% primary hydroxyl groups. More preferably, the polyols have at least about 65% primary hydroxyl groups; most preferred are polyols having at least about 75% primary hydroxyl groups. High primary hydroxyl group content is important; as Comparative Example 6 below shows, poor elastomers result when a low-primary polyol is used in the process of the invention.

The polyol also has low unsaturation. By "low-unsaturation," we mean less than about 0.02 meq/g of unsaturation as measured by standard methods, such as ASTM D-2849–69, "Testing of Urethane Foam Polyol Raw Materials." Preferred polyols have unsaturations less than about 0.01 meq/g; most preferred are polyols having unsaturations less than about 0.007 meq/g. Polyols with very low unsaturation levels are conveniently made via double metal cyanide catalysis as described, for example, in U.S. Pat. Nos. 5,470,813 and 5,482,908, the teachings of which are incorporated herein by reference.

The polyol preferably has an average hydroxyl functionality less than about 3. A more preferred range is from about 1.8 to about 3.0. In addition, the polyol preferably has a number average molecular weight within the range of about 500 to about 50,000. A more preferred range is from about 1000 to about 6000; most preferred is the range from about 2000 to about 6000.

The polyol preferably has an oxyethylene content of at least about 5 wt. %, more preferably from about 10 to about 20 wt. %, which can be present internally, as a tip, or as an endcap. Preferably, most of the oxyethylene content is located toward the end of the polyol to provide for the desirable high content of primary hydroxyl groups.

The high-primary, low-unsaturation polyol is typically the major component of the "B" side. Generally, it comprises at least about 40 wt. % of the resin component. A preferred range is from about 45 to about 90 wt. %, more preferably from about 50 to about 70 wt. % of the resin component.

The resin component also includes a chain extender. Useful chain extenders have at least two active hydrogens, and include low molecular weight diols, diamines, aminoalcohols, dithiols, or the like. Preferably, the chain extenders have number average molecular weights less than about 400, more preferably less than about 300. Diols are preferred chain extenders. Suitable chain extenders include, for example, ethylene glycol, propylene glycol, 2-methyl-1,3-propanediol, 1,4-butanediol, diethylene glycol, dipropylene glycol, triethylene glycol, tripropylene glycol, neopentyl glycol, cyclohexanedimethanol, 1,6-hexanediol, ethylene diamine, ethanedithiol, and the like, and mixtures thereof. Particularly preferred are dipropylene glycol, ethylene glycol, and 1,4-butanediol. A minor proportion of chain extender having 3 or more active hydrogens (e.g., glycerine) can be included if desired.

The chain extender is a minor "B" side component. Typically, it comprises less than about 30 wt. % of the resin component. A preferred range is from about 1 to about 20 wt. %, more preferably from about 3 to about 10 wt. % of the resin component.

The resin component optionally includes additional polyols, which may or may not be low-unsaturation or high-primary polyols. Preferably, the resin component includes a polymer polyol. Suitable polymer polyols include the well-known variety prepared by in situ polymerization of vinyl monomers in a base polyol to give a stable dispersion of polymer particles in the base polyol, such as styrene-acrylonitrile (SAN) polymer polyols. Other suitable polymer polyols include PIPA and PHD polyols, which are—like the SAN polymer polyols—commercially available. These polymer polyols have polymer solids contents generally in the range of about 5 to about 50 wt. %. When a polymer polyol is included, it is preferred to use an amount within the range of 5 to about 45 wt. % based on the total amount of resin component.

An isocyanate-terminated prepolymer ("A" side) reacts with the resin component ("B" side) in the process of the invention. The prepolymer is the reaction product of a polyisocyanate, a second high-primary, low-unsaturation polyol, and a second chain extender.

The polyisocyanate is an aromatic, aliphatic, or cycloaliphatic isocyanate that contains at least two free NCO groups. Suitable polyisocyanates include diphenylmethane diisocyanates (MDIs), polymeric MDIs, MDI variants, toluene diisocyanates, hexamethylene diisocyanate, isophorone diisocyanate, and the like, and mixtures thereof. Preferred polyisocyanates are 4,4'-MDI, other MDI blends that contain a substantial proportion of the 4,4'-MDI isomer, and modified MDIs made by reacting MDI with itself of another component to introduce carbodiimide, allophanate, urea, urethane, biuret, or other linkages into the structure (MDI variants). Particularly preferred are 4,4'-MDI, carbodiimide-modified MDIs, and mixtures thereof. The amount of polyisocyanate used is preferably the amount needed to give an NCO-terminated prepolymer or quasiprepolymer having a free NCO content within the range of about 15 to about 30 wt. %, more preferably from about 20 to about 28 wt. %.

The prepolymer includes a second high-primary, low-unsaturation polyol, which may be the same as or different from the first high-primary, low-unsaturation polyol. The second polyol has the same general characteristics as the first, however, i.e., low unsaturation (less than about 0.02 meq/g) and a high content (at least about 50%) of primary hydroxyl groups. The high-primary, low-unsaturation polyol is a minor "A" side component. The isocyanate-terminated prepolymer preferably comprises from about 1 to about 10 wt. % of the prepolymer component; a more preferred range is from about 2 to about 8 wt. %, The prepolymer also includes a chain extender. This chain extender (the "second" chain extender) may be the same as or different from the chain extender used in the resin component (the "first" chain extender). Otherwise, the second chain extender fits the above description of the first chain extender. The second chain extender, which is reacted into the "A" side, comprises from about 5 to about 60 equivalent percent of the total chain extender. Preferably, the second chain extender comprises from about 10 to about 40 equivalent percent of the total chain extender; a most preferred range is from about 15 to about 35 equivalent percent.

The amount of chain extender used to make the prepolymer is important. If less than about 5 equivalent percent is present, foam splitting, surface defects, and other problems result (see Comparative Example 8). On the other hand, if more than about 60 equivalent percent of the total chain extender is present in the "A" side, excessive heat can be generated, which can lead to unwanted gellation of the prepolymer.

While most prepolymers are simply reaction products of a polyisocyanate and a polyol, the present invention incorporates a chain extender into the prepolymer. I surprisingly found that pre-reacting 5 to 60 equivalent percent of the total chain extender into the "A" side, in combination with using a high-primary, low-unsaturation polyol, is the key to making low-density (less than 0.5 g/cm$^3$) microcellular elastomers while avoiding problems with poor processing or inferior physical properties. This simple step is crucial for providing lighter, high-quality polyurethane 1, products, particularly midsoles or shoe soles for footwear.

The prepolymer is generally made by combining the second polyol, second chain extender, and polyisocyanate in any desired order, and heating the mixture at a temperature and for a time effective to produce an isocyanate-terminated prepolymer. Usually, it is preferred to react the polyisocyanate and the high-primary, low-unsaturation polyol together for a short time before introducing the second chain extender. Heating then continues until the prepolymer reaches the desired content of free NCO groups. In another preferred mode, all or part of the second chain extender is included at the start of the prepolymer-forming reaction.

After the prepolymer has been made, it is combined with the resin component using conventional techniques to make the microcellular elastomer. The resin component is a well-blended mixture of the first low unsaturation polyol, the first chain extender, and other optional components such as blowing agents, surfactant, catalysts, and the like. The elastomers can be made by hand casting or machine. The "A" and "B" side components are combined, rapidly mixed, and injected or poured into open or closed molds. The formulations described herein are well suited for use with commercial equipment (such as the Gusbi molding machine) for making midsoles and shoe soles by closed molding techniques.

Preferably, the process of the invention is performed in the presence of a blowing agent. Suitable blowing agents are those well known in the art of formulating microcellular polyurethane elastomers. They include "physical" blowing agents, such as low-boiling halocarbons (e.g., CFCs, HCFCs, methylene chloride) or hydrocarbons (e.g., butane, pentane), inert gases (e.g., nitrogen, argon, carbon dioxide), or the like, and "reactive" blowing agents, such as water and other active-hydrogen compounds that react with NCO groups to liberate gases. Mixtures of blowing agents can be used. Water is a particularly preferred blowing agent. The blowing agent is used in an amount needed to produce a microcellular elastomer having a density of less than 0.5 g/cm$^3$. Preferably, the resulting elastomer has a density within the range of about 0.02 to about 0.4 g/cm$^3$; most preferred is the range from about 0.1 to about 0.3 g/cm$^3$.

The process optionally includes other conventional urethane foam components, such as surfactants, blowing catalysts, urethane-forming catalysts, pigments, UV stabilizers, crosslinkers, antioxidants, other polyols, and/or other additives. These optional ingredients are preferably mixed thoroughly with the resin component before reacting it with the "A" side to make the elastomer.

The process of the invention offers advantages for elastomer processing. "Moving" the right amount of chain extender into the "A" side component gives improved control over reactivity and flowability during elastomer processing because a significant fraction of the total reaction happens before the elastomer is formulated. The process also offers wide processing latitude. As the examples below demonstrate, excellent products can be made over a broad temperature range (40–60° C.) and a broad index range (95 to 105), and demold times are short (<7 min).

The process also offers physical property advantages. In the past, it was difficult to make microcellular elastomers with densities less than 0.5 g/cm$^3$ (especially ones with densities less than 0.3 g/cm$^3$) while avoiding problems with product quality. Microcellular elastomers made using the process of the invention have excellent tensile and tear strength, good skin quality, and no internal splits. As the examples below show, the process of the invention makes it possible to formulate—with ease—excellent elastomers The following examples merely illustrate the invention. Those skilled in the art will recognize many variations that are within the spirit of the invention and scope of the claims.

EXAMPLES 1–5 and COMPARATIVE EXAMPLE 6

Preparation of Microcellular Polyurethane Elastomers

A Gusbi machine is used to mold 10-mm microelastomer plaques by reaction injection molding mixtures of the "A" and "B" -side components described below at 35° C. Mold temperatures are in the 40–60° C. range. The products are tack-free in less than one minute. Physical properties appear in Table 1.

As the table shows, microcellular elastomers with densities less than 0.27 g/cm$^3$ and an excellent balance of properties are available from the process of invention. In each example of the invention, the "A" side includes a chain extender (dipropylene glycol) and a high-primary, low-unsaturation polyol. Comparative Example 6 demonstrate s the importance of using a "high-primary" polyol. Low unsaturation alone is not enough to give good products at such low densities.

| Formulation | |
| --- | --- |
| Resin component ("B" side) | pbw |
| Low-unsaturation polyol (see Table 1) | 58 |
| Polymer polyol[1] | 35 |
| Water | 1.1 |
| Ethylene glycol | 5.2 |
| Dabco EG catalyst[2] | 0.2 |
| X-8154 catalyst[2] | 1.0 |
| BL-17 catalyst[2] | 0.2 |
| T-120 catalyst[2] | 0.02 |
| DC-193 surfactant[3] | 0.25 |
| LK-221 emulsifier[2] | 0.75 |
| Pigment (e.g., carbon black or $TiO_2$) | 1.2 |
| B-75 stabilizer[4] | 1.0 |
| Prepolymer ("A" side; 24 wt. % NCO) | |
| 4,4'-MDI | 80 |
| Carbodiimide-modified MDI | 8 |
| Low-unsaturation polyol (see Table 1) | 5 |
| Dipropylene glycol | 7 |

[1]SAN-type, 43 wt. % solids content, hydroxyl number 20 mg KOH/g
[2]product of Air Products;
[3]product of Dow Corning;
[4]product of Ciba-Geigy.

TABLE 1

Microcellular Polyurethane Elastomers

| Example | 1 | 2 | 3 | 4 | 5 | C6 |
| --- | --- | --- | --- | --- | --- | --- |
| Resin polyol | A-4220 | A-4220 | A-4220 | A-2220 | A-4220 | A-3201 |
| Prepolymer polyol | A-4220 | A-4220 | A-4220 | A-2220 | A-2220 | A-3201 |
| A/B side (w/w) | 0.53 | 0.55 | 0.58 | 0.55 | 0.55 | 0.55 |
| Index (NCO/OH) | 0.95 | 1.00 | 1.05 | 1.00 | 1.00 | 1.00 |
| Physical Properties | | | | | | |
| Density (g/cm³) | 0.265 | 0.265 | 0.265 | 0.265 | 0.265 | 0.265 |
| Hardness (Asker C) | 61 | 62 | 62 | 60 | 60 | 58 |
| Tensile strength (kg/cm²) | 19.4 | 20.8 | 23.2 | 16.4 | 19.2 | * |
| Elongation (%) | 307 | 255 | 296 | 319 | 324 | * |
| Split tear (kg/cm, 10 mm) | 2.3 | 2.6 | 2.6 | 1.9 | 2.1 | * |

A-4220 is Accuflex 4220 polyol, a polyoxypropylene diol having Mn = 4000, about 20 wt. % oxyethylene content (5% internal, 15% cap), and a primary hydroxyl group content of about 85%; A-2220 is Accuflex 2220 polyol, a polyoxypropylene diol having Mn = 2000, about 20 wt. % oxyethylene content (5% internal, 15% cap), and a primary hydroxyl group content of about 85%; A-3201 is Accuflex 3201 polyol, apolyoxypropylene diol having Mn = 3000, about 10 wt. % internal oxyethylene content; all are products of ARCO Chemical.
*Sample cracks and cannot be tested.

EXAMPLE 7

The procedure of Examples 1–5 is followed, except that the prepolymer is made using 52 parts of 4,4'-MDI, 4 parts of dipropylene glycol,and 3 parts of Accuflex 4220 polyol.

The resulting midsoles, which can be molded easily over a broad temperature range of 40 to 60° C., are excellent. Physical properties: density: 0.26 g/cm³; Asker C hardness: 60–65; split tear strength: 2.0 kg/cm; tensile strength: 19 kg/cm². Demold time is less than 7 min., and no skin peeling or internal splitting is evident.

COMPARATIVE EXAMPLE 8

In this example, all of the chain extender to be used is included in the resin component ("B" side).

The procedure of Example 7 is followed, with the following changes. The resin blend contains 1.5 parts of water and 12.5 parts of ethylene glycol. The prepolymer is made using 81 parts of 4,4'-MDI, 46 parts of Accuflex 4220 polyol, and no chain extender.

The resulting midsoles are poor. Physical properties: density: 0.26 g/cm³; Asker C Hardness: 60–65 ;split tear strength: 1.6 kg/cm; tensile strength; 17 kg/cm². Demold time is 7 min. or more. Many of the samples have poor skin quality, which is evident upon demolding. In addition, many of the parts have internal splits.

The preceding examples are meant only as illustrations; the following claims define the scope of the invention.

I claim:

1. A process which comprises reacting a resin component ("B" side) with an isocyanate-terminated prepolymer ("A" side), optionally in the presence of a blowing agent, a surfactant, and a catalyst, to produce a microcellular polyurethane elastomer having a density less than 0.5 g/cm³;

wherein the resin component comprises a mixture of a first chain extender and a first polyol;

wherein the prepolymer is made by reacting a polyisocyanate, a second polyol, which may be the same as or different from the first polyol, and a second chain extender, which may be the same as or different from the first chain extender;

wherein the second chain extender reacted into the "A" side comprises from about 5 to about 60 equivalent percent of the total chain extender; and wherein each of the first and second polyols has at least about 50% primary hydroxyl groups and an unsaturation less than about 0.02 meg/g.

2. The process of claim 1 wherein the elastomer has a density within the range of 0.02 to 0.4 g/cm³.

3. The process of claim 1 wherein the second chain extender comprises from about 10 to about 40 equivalent percent of the total chain extender.

4. A microcellular polyurethane elastomer which comprises the reaction product of:

(a) a resin component ("B" side) comprising a mixture of:
      (i) a first polyol;
      (ii) a first chain extender; and
      (iii) optionally, a blowing agent, a surfactant, and a catalyst; and (b) an isocyanate-terminated prepolymer ("A" side) comprising the reaction product of:
      (i) a polyisocyanate;
      (ii) a second polyol, which may be the same as or different from the first polyol; and
      (iii) a second chain extender, which may be the same as or different from the first chain extender;

wherein the second chain extender reacted into the "A" side comprises from about 5 to about 60 equivalent percent of the total chain extender;

wherein each of the first and second polyols has at least about 50% primary hydroxyl groups and an unsaturation less than about 0.02 meg/g; and wherein the elastomer has a density of less than 0.5 g/cm³.

5. The elastomer of claim 4 having a density within the range of about 0.02 to about 0.4 g/cm³.

6. The elastomer of claim 4 wherein the "B" side includes a polymer polyol.

7. The elastomer of claim 4 wherein the blowing agent is water.

8. The elastomer of claim 4 wherein the polyisocyanate comprises a mixture of a major proportion of 4,4'-MDI and a minor proportion of carbodiimide-modified MDI.

9. The elastomer of claim 4 wherein one or both of the polyols have a primary hydroxyl end group contents greater than about 75% and unsaturation levels of less than about 0.007 meq/g.

10. The elastomer of claim 4 wherein the second chain extender comprises from about 10 to about 40 equivalent percent of the total chain extender.

11. The elastomer of claim 4 wherein one or both chain extenders are selected from the group consisting of ethylene glycol, propylene glycol, diethylene glycol, dipropylene glycol, triethylene glycol, tripropylene glycol, ethylene diamine, and mixtures thereof.

12. In a process for making a microcellular polyurethane elastomer that is the reaction product of: (a) a resin component ("B" side) comprising a first polyol, said first polyol having at least about 50% primary hydroxyl groups and an unsaturation less than about 0.02 meg/g, and a first chain extender and (b) an isocyanate-terminated prepolymer ("A" side), the improvement which comprises:

making the prepolymer by reacting a polyisocyanate, a second polyol having at least about 50% primary hydroxyl groups and an unsaturation less than about 0.02 meg/q, which may be the same as or different from the first polyol, and a second chain extender, which may be the same as or different from the first chain extender, wherein the second chain extender reacted into the "A" side comprises from about 5 to about 60 equivalent percent of the total chain extender; and wherein the resulting elastomer has a density less than 0.5 g/cm$^3$.

13. A shoe sole comprising the microcellular elastomer of claim 4.

14. A midsole comprising the microcellular elastomer of claim 4.

* * * * *